(12) United States Patent
Asvaren et al.

(10) Patent No.: US 12,489,780 B2
(45) Date of Patent: Dec. 2, 2025

(54) METHODS, DEVICES, AND SYSTEMS FOR PROVIDING DYNAMIC PROTECTION AGAINST AMPLIFICATION ATTACKS

(71) Applicant: Ribbon Communications Operating Company, Inc., Plano, TX (US)

(72) Inventors: Tolga Asvaren, Bordentown, NJ (US); Subhransu S. Nayak, Acton, MA (US)

(73) Assignee: Ribbon Communications Operating Company, Inc., Plano, TX (US)

( * ) Notice: Subject to any disclaimer, the term of this patent is extended or adjusted under 35 U.S.C. 154(b) by 274 days.

(21) Appl. No.: 17/884,846

(22) Filed: Aug. 10, 2022

(65) Prior Publication Data
US 2024/0056474 A1    Feb. 15, 2024

(51) Int. Cl.
*H04L 9/40* (2022.01)
*H04L 65/1104* (2022.01)

(52) U.S. Cl.
CPC ...... *H04L 63/1441* (2013.01); *H04L 65/1104* (2022.05)

(58) Field of Classification Search
USPC .......................................................... 726/22
See application file for complete search history.

(56) References Cited

U.S. PATENT DOCUMENTS

| | | | |
|---|---|---|---|
| 7,529,186 B2 * | 5/2009 | Smethurst | H04L 63/1458 370/360 |
| 9,455,927 B1 * | 9/2016 | Nayak | H04L 47/10 |
| 10,050,937 B1 * | 8/2018 | Gandhewar | H04L 63/0236 |
| 10,785,369 B1 | 9/2020 | Dashevskiy et al. | |
| 2006/0285493 A1 * | 12/2006 | Manuja | H04L 47/125 370/235 |
| 2008/0031258 A1 * | 2/2008 | Acharya | H04L 47/19 370/395.42 |
| 2008/0216160 A1 * | 9/2008 | Rollet | H04L 63/205 726/6 |
| 2009/0077616 A1 * | 3/2009 | Lindholm | H04L 63/20 726/1 |
| 2009/0203524 A1 | 8/2009 | Baumann et al. | |
| 2010/0036953 A1 * | 2/2010 | Bogovic | H04L 45/30 709/226 |

(Continued)

FOREIGN PATENT DOCUMENTS

CN    112995099 A  *  6/2021  ............. H04L 63/02

OTHER PUBLICATIONS

RFC 3311, The Session Initiation Protocol (SIP) Update Method (Year: 2002).*

(Continued)

*Primary Examiner* — Sakinah White Taylor
(74) *Attorney, Agent, or Firm* — Brooks, Cameron & Huebsch, PLLC (57) ABSTRACT

Methods, devices, and systems for providing dynamic protection against amplification attacks are described herein. One communications method includes receiving, at a session border controller (SBC), a first request message from a peer device that does not have an assigned trust level, determining, based on a type of communication that is received from the peer device, whether the peer device should be classified as an untrusted level, semi-trusted level, or trusted level peer device, and assigning the classification to the peer device for use in subsequent communications with the peer device.

19 Claims, 9 Drawing Sheets

(56) References Cited

U.S. PATENT DOCUMENTS

| | | | |
|---|---|---|---|
| 2011/0072508 A1* | 3/2011 | Agarwal | H04L 63/0227 726/13 |
| 2011/0083175 A1* | 4/2011 | Bharrat | H04L 47/20 709/224 |
| 2019/0281021 A1* | 9/2019 | Asveren | H04L 63/0236 |
| 2020/0106806 A1* | 4/2020 | Gupta | H04L 61/4511 |
| 2020/0252503 A1* | 8/2020 | Li | H04L 65/1016 |
| 2022/0407841 A1* | 12/2022 | Karpowicz | H04L 63/0263 |

OTHER PUBLICATIONS

Oracle Communications Session Border Controller Security Guide (Year: 2022).*
Search Report from related EP Application 23190695.9 dated Oct. 2, 2023 (10 pages).

* cited by examiner

METHODS, DEVICES, AND SYSTEMS FOR PROVIDING DYNAMIC PROTECTION AGAINST AMPLIFICATION ATTACKS

TECHNICAL FIELD

The present disclosure relates to methods, devices, and systems for providing dynamic protection against amplification attacks.

BACKGROUND

Distributed denial of service (DDoS) attacks continue to be a major issue for communications service providers, putting critical systems at risk, undercutting service level agreements, and bringing unwanted headlines to the service providers and their customers. The first half of 2021 alone saw 5.4 million of these attacks reported. Some common characteristics across these attacks included:

- 85% of attacks lasted less than 10 minutes, to avoid detection;
- 99% of all attacks were less than 10 Gb/s, so they were very focused; and
- a 29% chance of a similar repeat attack within 7 days.

Voice over Internet Protocol (VoIP) infrastructure is usually protected by a session border controller (SBC) that provides various mitigation functions. For example, the SBC can provide mitigation by applying access level control to allow traffic from trusted pre-configured IP addresses, providing media packet policing where media packets are accepted only if they correspond to a session negotiated via session initiation protocol/session description protocol (SIP/SDP) signaling, providing media address learning where if a peer media address advertised in SIP/SDP does not match the actual source address of the route transfer protocol (RTP) packets it is possible to learn the peer media address to perform policing of subsequent packets, providing priority aware packet policing where rate limit SIP signaling packets on a micropacket flow basis give higher priority to packets from authenticated sources than those from unknown sources significantly increasing the likelihood that desired traffic gets let through while malicious traffic is stopped, and providing application-level call admission control (CAC) where CAC is used to rate limit traffic on a peer/IP trunk/IP trunk group level and can also be provided to limit bandwidth usage.

A SBC provides various attack mitigation mechanisms at various network infrastructure levels. The lowest level of protection is on the IP packet level and functions at the wire-rate. IP packet protection usually utilizes different policers to prioritize traffic from trusted entities so that they are not impacted during a DDoS attack. This requires a mechanism to determine which entities are trusted. When other network elements are concerned, this trusted entity list is usually known a priori and added during configuration of system devices or the system itself.

In such systems, there are also certain deployment models where a priori knowledge about trusted entities is not available. This makes such deployments especially vulnerable to amplification based DDoS attacks as it is not possible to prioritize traffic from trusted entities.

Further, amplification based DDoS attacks against VoIP infrastructure are proliferating. These attacks usually have the following characteristics: the attacks are applicable to the user datagram protocol (UDP) packets, the attacks use servers such as SNMP/DNS/Memcached as amplifiers, response messages that the attacks generate are much bigger than the request itself, an amplification factor can range from single digits to hundreds of thousands, the attackers can use a multitude of reflectors, and the identity of the attacker can be concealed.

These amplification attacks can be particularly troubling, as they typically occur where their trust level cannot be ascertained based on an a priori list, and current mitigation efforts are not adequate in most instances. For example, the attacker may target an area where there are many peer devices and where the peers have IP addresses that are frequently changing. In such areas, it can be difficult for a target device to keep an accurate updated list of trusted devices.

DETAILED DESCRIPTION

In the embodiments of the present disclosure, methods, devices, and systems for providing dynamic protection against amplification attacks are disclosed. Embodiments of the present disclosure can, for example, allow establishing trust for network entities dynamically.

For instance, one or more method embodiments include receiving, at a session border controller (SBC), a first request message from a peer device that does not have an assigned trust level, determining, based on a type of communication that is received from the peer device, whether the peer device should be classified as an untrusted level, semi-trusted level, or trusted level peer device, and assigning the classification to the peer device for use in subsequent communications with the peer device.

Embodiments of the present disclosure utilize the concepts of limited-trusted entities and trusted entities to accomplish a higher level of security against amplification attacks. Both of these concepts prioritize packets from a corresponding entity, but the limited-trust concept does so only for a limited number of packets that would be sufficient to upgrade the entity for trusted status, if its packets arrive as expected. As utilized in these concepts, entities are defined by a source IP address/port of the IP packets received by the SBC.

The following conditions will determine the trust level of an entity. It should be understood that initially the entities are not known, therefore, they are implicitly untrusted.

1. Receive an initial INVITE request=>limited-trust=>Receipt of an ACK message=>trusted 2. The peer device is present in a record-route header in the initial INVITE request=>limited-trust=>Receipt of a SIP message from the entity matching the SIP dialog=>trusted 3. Receive a non-INVITE out-of-dialog message (e.g., SUBSCRIBE, PUBLISH)=>limited-trust (SBC does not generate a reply and expects the SIP peer to retransmit the request)=>Receive a retransmission of the same message=>trusted 4. The peer device is present in a record-route header for a dialog creating SUBSCRIBE request=>semi-trusted=>Receipt of a SIP message from the entity matching the SIP dialog=>trusted 5. Limited-trust/trust=>No message received for a configurable amount of time=>untrusted (i.e., SBC does not track the entity anymore and the corresponding policer is removed). More detail of the conditions regarding trust level are provided below.

In the following portion of the detailed description, reference is made to the accompanying figures that form a part hereof. The figures show by way of illustration how one or more embodiments of the present disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense. Also, as used herein, "a" or "a number of" something can refer to one or more such things. For example, "a number of peer devices" can refer to one or more peer devices.

Figure 1:
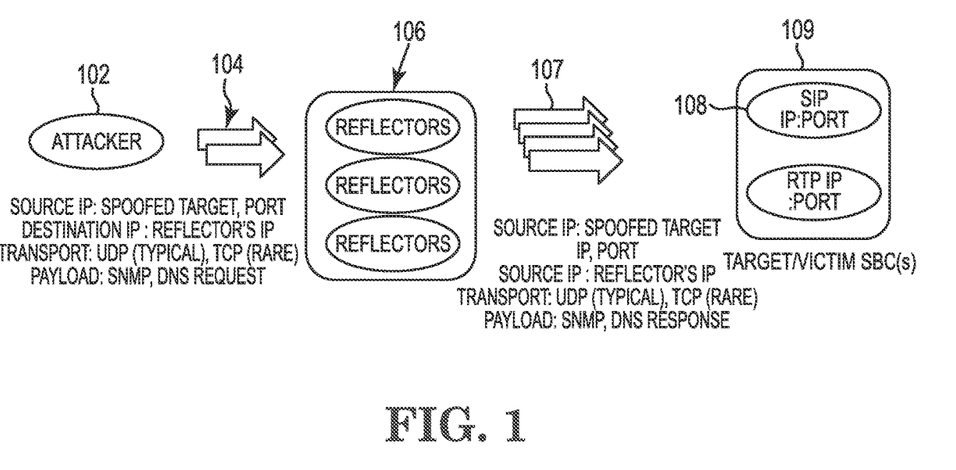
FIG. 1 illustrates an example of an amplification based DDoS attack against VoIP infrastructure that can be mitigated according to one or more embodiments of the present disclosure.

FIG. 1 illustrates an example of an amplification based DDoS attack against VoIP infrastructure that can be mitigated according to one or more embodiments of the present disclosure. As discussed above, Amplification based DDoS attacks against VoIP infrastructure usually have the following characteristics, they are applicable for UDP, they use SNMP/DNS/Memcached Servers as amplifiers, the response messages they generate are much bigger than the request itself, the amplification factor can range from single digits (e.g., SNMPv2), to hundreds of thousands of digits (e.g., Memcachd). Further, the attackers can use a multitude of reflectors and the identity of the attacker is concealed.

In the illustration of FIG. 1, the attacker via attacking device 102, sends a first number of messages 104 to a port 108 on the target device 109, but they are passed through a number of reflectors 106 before they reach the target device 109 (e.g., an SBC), thereby creating a second number of messages 107 that are more than the originally sent first number of messages 104. Often, the second number of messages is significantly higher than the first number of messages.

In the example of FIG. 1, the attacker uses a source IP address, for the first number of messages 104, that is a spoofed target IP address/port. The destination IP address is the IP address for one of the reflectors. Here, the messages are sent via UDP as a DNS request with an SNUP payload.

The reflectors receive these first messages and create a second number of messages 107 that use the spoofed target IP address/port as the destination address with the reflector's IP address as the source address. DNS responses usually contain a high number of records causing them to have a large size. As discussed above, these response messages can be considerably larger than the request message. Such attacks can be managed with the embodiments discussed below. For example, using different trust levels to mitigate various types of attacks is an efficient strategy and is discussed in more detail with regard to FIG. 2.

Figure 2:
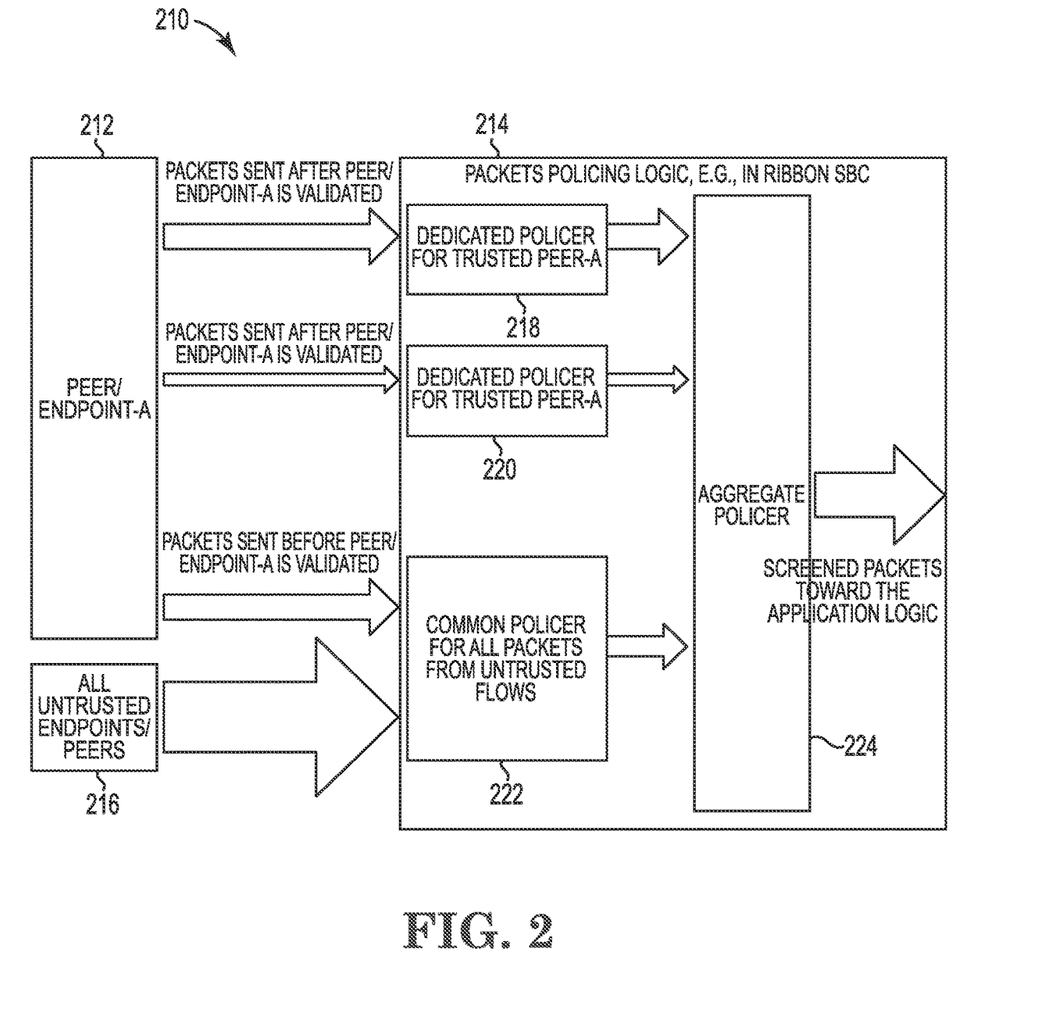
FIG. 2 illustrates a general overview of a process for providing dynamic protection against amplification attacks according to one or more embodiments of the present disclosure.

FIG. 2 illustrates a general overview of a process for providing dynamic protection against amplification attacks according to one or more embodiments of the present disclosure. As used herein, a "trust level" corresponds to different semantics and/or processing steps that are associated with IP packets by a target device when received from a particular source.

Usually, the packets are characterized according to a 5-tuple value from the IP packet header. These are: source IP Address, source port, destination IP Address, destination port, transport protocol. The term "IP packet flow" can interchangeably be used for a 5-tuple match.

Attack protection utilizing trust levels may involve several different levels. For this example, a 3-tier approach can be used, including:

Untrusted: These are packets corresponding to packet flows which did not go through any verification step;

Semi-trusted: These are packets corresponding to packet flows which are in the process of verification but require more packets to be received for a conclusion regarding whether they are verified; and Trusted: These are packets corresponding to packet flows which have successfully completed verification process.

A different policer (software executable instructions for execution by a processor) can be used for each trust level and are used to determine what packets are allowed to be received by the target device. Some policers can, for example, be implemented as "Token Bucket Policers" but any mechanism that provides similar results can be utilized. The different types of policers are discussed in more detail below.

Policer for Untrusted Packet flows 222 from untrusted endpoint 216: All untrusted packet flows can be processed by a single policer (e.g., endpoints 212 and 216). The fill rate of this policer can be adjusted so that it admits a sufficient number of packets for new packet flows to possibly be verified, but not so many that their verification processing and/or queue begin to affect the performance of the verification process.

Policers for Semi-Trusted Packet flows 222: Here, a dedicated Semi-trusted Policer is used for each packet flow while the particular packet is in the process being verified. In some embodiments, these policers have a "0" fill rate but have sufficient bucket size to accept packets needed for the verification to complete including some cushion to accommodate for retransmissions. A limited number of such policers are utilized to prevent DoS attacks as a policer itself is a limited resource.

Policers for Trusted Packet flows 218 and 220 from peer device 212: A dedicated Trusted Policer is used for each packet flow which already is verified. These policers have a fill rate adjusted according to system characteristics and expected packet rate from trusted packet flows. A limited number of such policers are utilized to prevent DoS attacks as a policer itself is a limited resource.

The aggregate fill rate of all policers does not exceed a limit which is considered as the maximum rate the downstream application processing can handle. This usually is enforced by an aggregate policer. For some implementations, each aforementioned policer admits all packets but adds a mark to them indicating whether they caused the policer fill rate to be violated. An aggregate policer 224 admits packets based on from which policer (e.g., 218, 220 or 222) the packets are admitted and, in some embodiments, an additional indication mark.

The net result of applying all these policing rules is that the downstream application logic (provided by software executable instructions) is not exposed to a packet rate that the logic cannot handle and the packets are delivered according to a priority policy driven by the trust level of the packet flow. Packets for trusted packet flows have the highest priority followed by packets for semi-trusted packet flows. Packets from untrusted endpoint packet flows have the lowest priority.

The following conditions will determine the trust level of a packet flow.

Initially, if the packet flows are not verified (i.e., known to the target device 214) then they are implicitly untrusted.

An initial INVITE request is received by the target device 214 and it is assigned a trust level of =>limited-trust=>Upon receipt of an ACK message, the trust level is changed to =>trusted.

Alternatively, the limited-trust=>trusted transition may happen when a VoIP session is fully established and a configurable threshold number of media packets are exchanged and/or the media session continues more than a configurable threshold amount of time.

Also, in some embodiments, a packet flow corresponding to the top-most Record-Route header in the initial INVITE request is assigned a trust level of =>limited-trust=>Upon receipt of a SIP message for the packet flow matching the SIP dialog the trust level is changed=>trusted.

Alternatively, the limited-trust=>trusted transition may happen when a VoIP session is fully established and a (e.g., configurable number of media packets are exchanged and/or the media session continues more than a configurable amount of time) and a SIP message is received by the target device 214 for the packet flow matching the SIP dialog.

Further, receipt of a non-INVITE out-of-dialog message by the target device (e.g., SUBSCRIBE, PUBLISH) is assigned a trust level of =>limited-trust (in such cases, the SBC may not generate a reply and expects the SIP peer to retransmit the request)=> If a receipt of a retransmission of the same message is received the trust level is changed to =>trusted.

Packet flow corresponding to the top-most Record-Route header for a dialog creating SUBSCRIBE request is assigned a trust level of =>semi-trusted=>Upon receipt of a SIP message from the entity matching the SIP dialog the trust level is changed to =>trusted.

Further, in some embodiments, if the target device has not received a message from a limited-trust or trusted peer device for a configurable amount of time its trust level is changed to =>untrusted. (i.e., SBC does not track the packet flow anymore and the corresponding dedicated policer is removed from its connection to that particular peer device).

In various embodiments, target device 214 includes a processor and a memory, to provide message and packet policing logic functions described in the embodiments herein.

The memory can include volatile and/or non-volatile memory. The memory can be coupled to the processor and can store instructions (e.g., computer program instructions). The memory can be any type of storage medium that can be accessed by the processor to perform various examples of the present disclosure. For example, the memory can be a non-transitory computer readable medium having computer readable instructions stored thereon that are executable by the processor to perform functions such as to determine in what trust level a particular peer device belongs.

The following sets of figures provide several alternative embodiments of the present disclosure. They are referred to as variants 1, 2, and 3 and are described in detail below.

Figure 3:
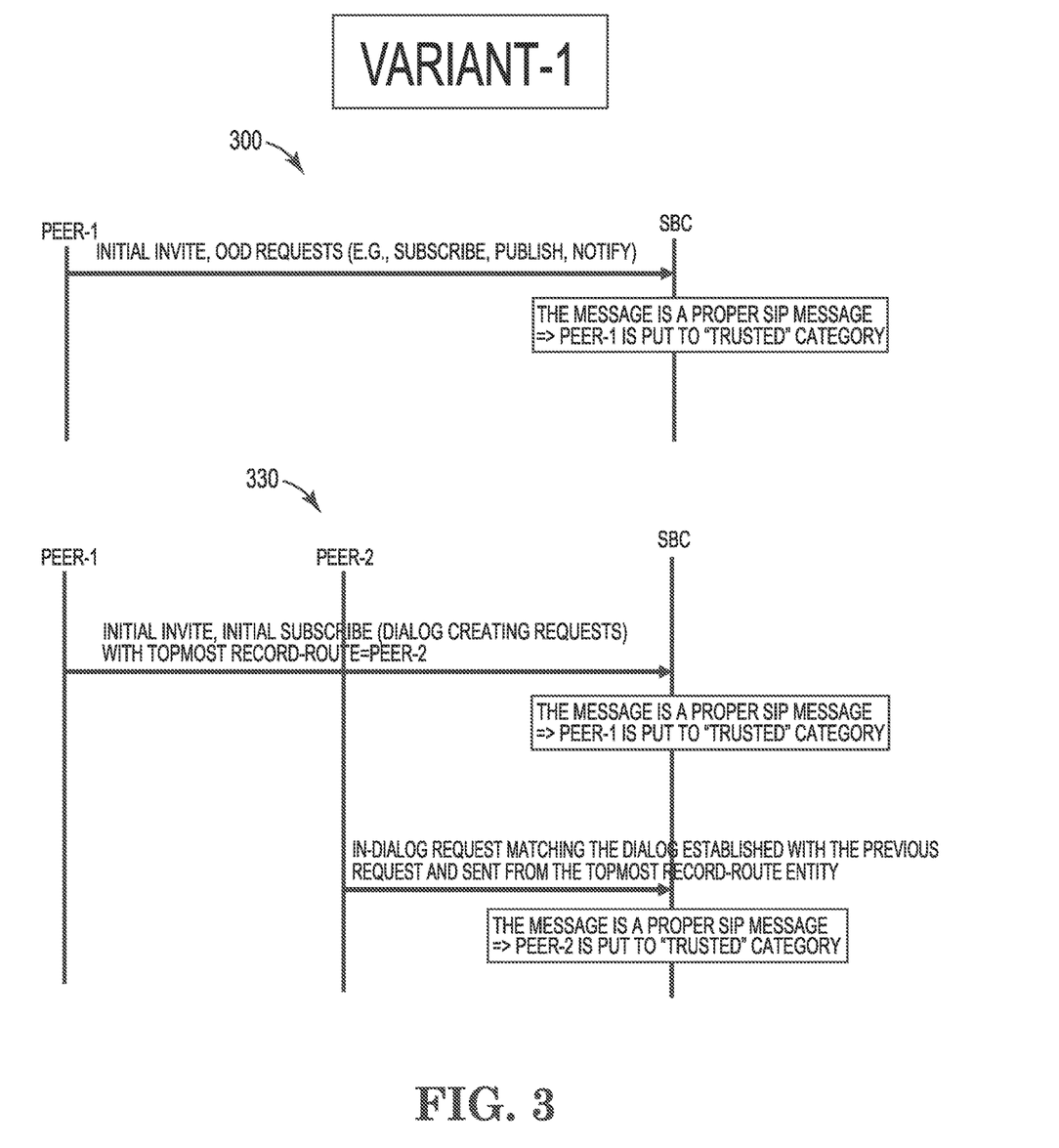
FIG. 3 illustrates a first variant of a process for providing dynamic protection against amplification attacks according to one or more embodiments of the present disclosure.

FIG. 3 illustrates a first variant of a process for providing dynamic protection against amplification attacks according to one or more embodiments of the present disclosure. This variant embodiments shown are effective against amplification attacks that cause a flood on non-SIP packets and/or messages sent to a SBC.

In the embodiment 300 an initial INVITE out-of-dialog (OOD) request is sent by a peer device (called Peer-1) to a SBC device (the target device). This INVITE request can, for example, be a subscribe, publish, or notify request message. Since the message type and format are a proper SIP message, the trust level determining software assigns Peer-1 to the trusted level category of peer devices. For instance, the packet and/or message is proper because it parses successfully according to SIP syntax and/or contains all mandatory headers and/or parameters.

In the lower flow 330 of FIG. 3, the flow passes from a first peer (Peer-1) through a second peer (Peer-2) and then to the SBC. Here, a first message is sent to the SBC by Peer-1 (an initial INVITE, initial SUBSCRIBE (dialog creating requests) with topmost record-route=Peer-2). This type and format of message is a proper SIP message and, as such, the system determines and assigns Peer-1 to the trusted level of peer devices.

The next dialog illustrated is between Peer-2 and the SBC. Here, an in-dialog request that matches the dialog established with the previous request and that was sent from the topmost record-route entity. This type and format of message is also a proper SIP message and, as such, the system determines and assigns Peer-2 to the trusted level of peer devices.

Figure 4:
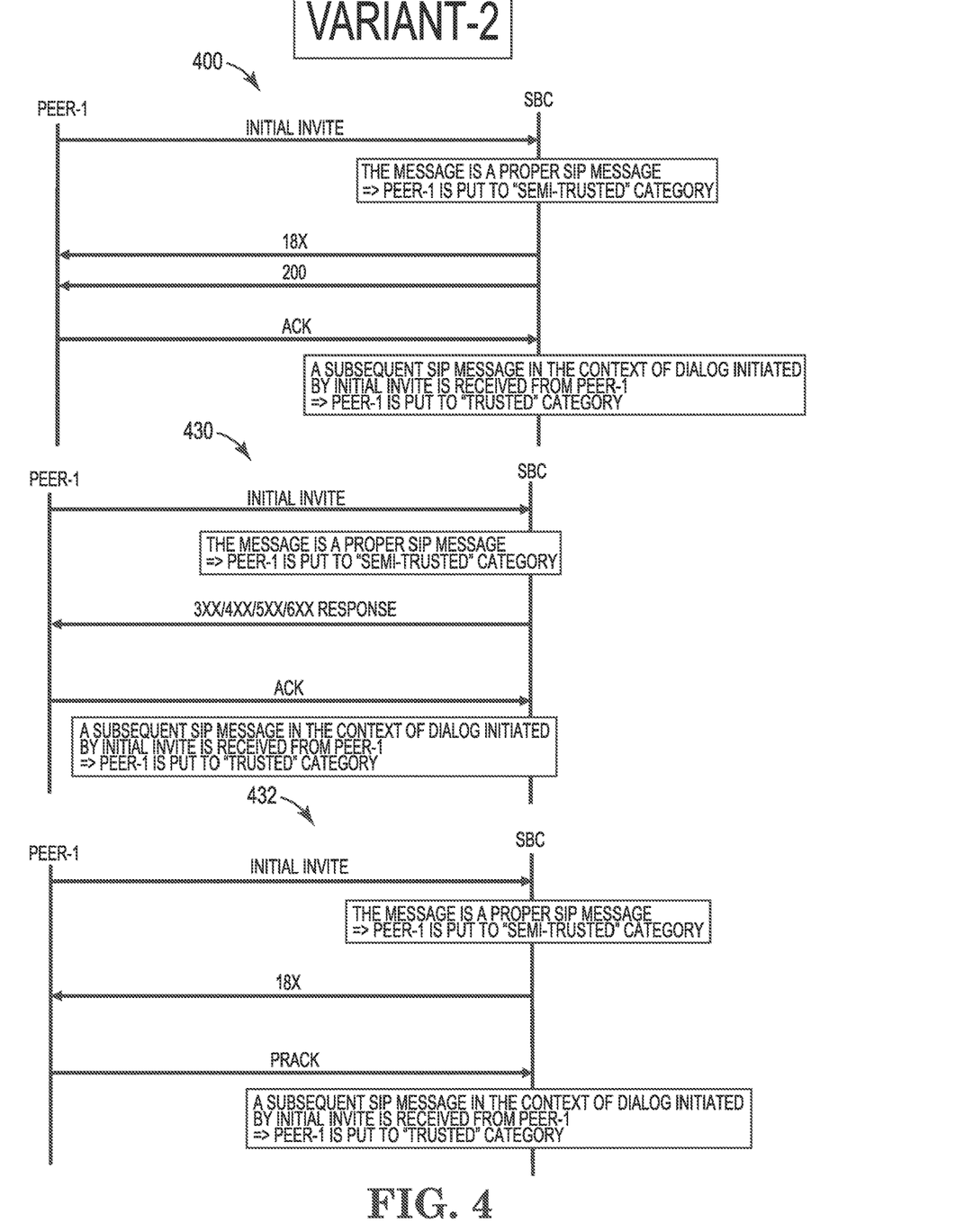
FIGS. 4-6 illustrate a second variant of a process for providing dynamic protection against amplification attacks according to one or more embodiments of the present disclosure.
Figure 5:
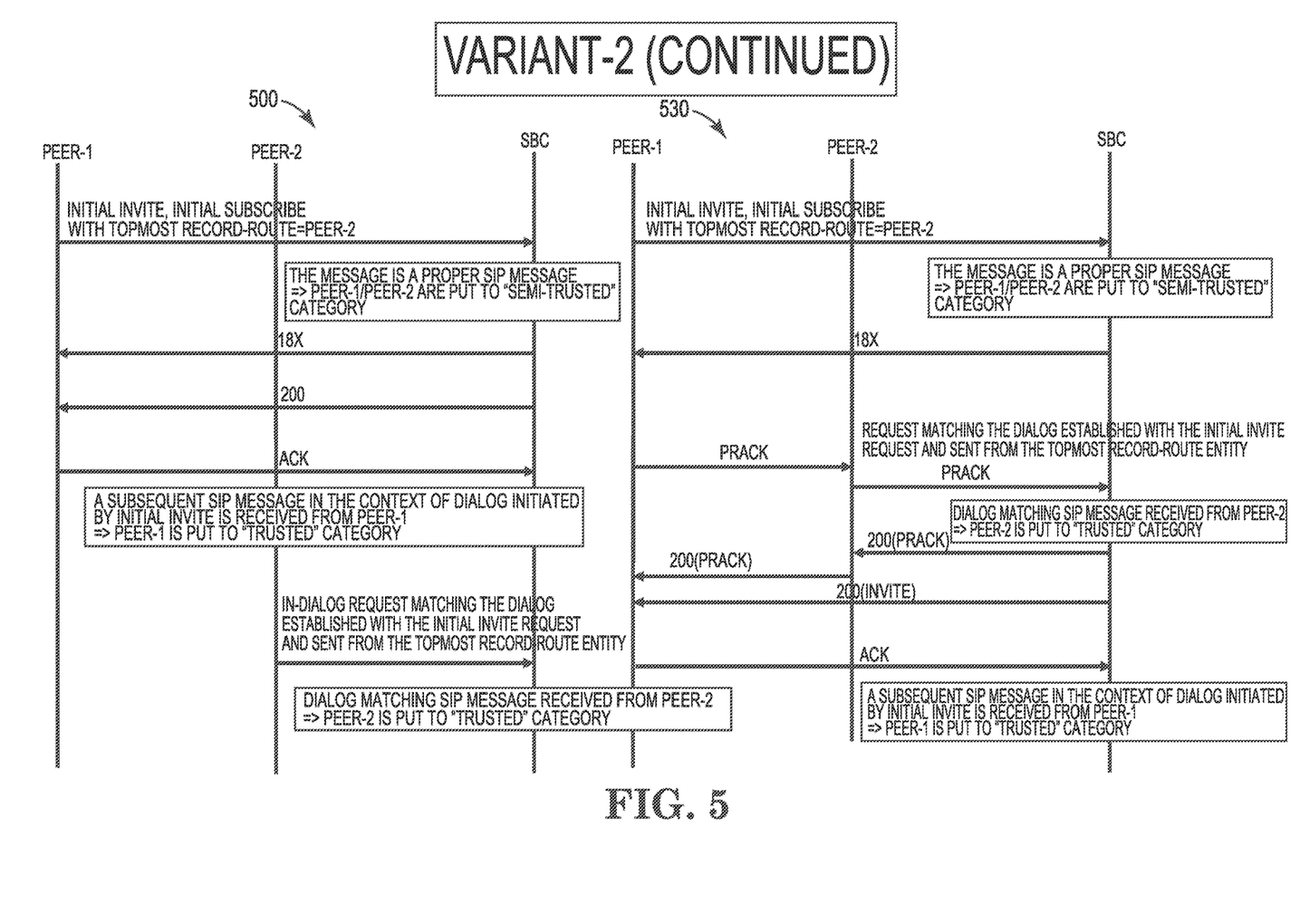
Figure 6:
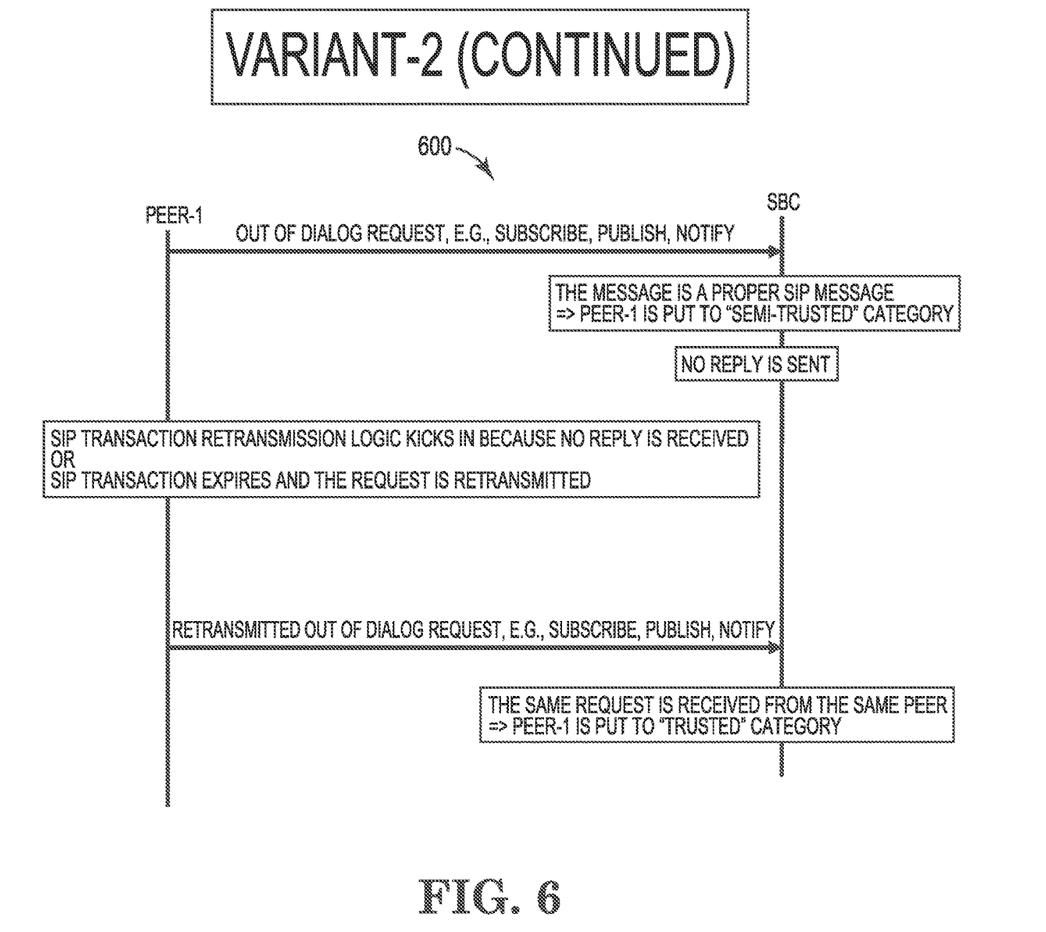

FIGS. 4-6 illustrate a second variant of a process for providing dynamic protection against amplification attacks according to one or more embodiments of the present disclosure. Here, in addition to the attacks covered by the first variant, the second variant embodiments are effective against attackers that send a large volume of SIP messages based on a template but do not run the corresponding SIP transaction state machine. In these embodiments, a peer is considered "trusted" only after it sends a second message in the context of the initiated dialog. Such a message will validate that a peer is operating a SIP stack and is sending messages by adhering to the SIP dialog and/or processing rules.

Accordingly, in the embodiment 400 beginning at the top of FIG. 4, Peer-1 sends an initial INVITE request to the SBC. The type and format of this first message is a proper SIP message and, as such, the system determines and assigns Peer-1 to a semi-trusted level of peer devices. The SBC sends back a provisional response message followed by a final response message acknowledging that it received the request and is waiting a predetermined period for an acknowledgement message that it then receives from Peer-1. This subsequent message from Peer-1 in the context of the dialog that was initiated by the initial INVITE satisfies the "in context" rule for determining whether Peer-1 is a trusted device. As such, Peer-1 is determined and assigned to the trusted level category of peer devices.

In the embodiment at 430, Peer-1 also sends an initial INVITE request to the SBC. The type and format of this first message is a proper SIP message and, as such, the system determines and assigns Peer-1 to semi-trusted level of peer devices. In this example, the SBC returns a response to Peer-1. Peer-1 then sends an acknowledgement message back to the SBC. This subsequent message from Peer-1 in the context of the dialog that was initiated by the initial INVITE satisfies the "in context" rule for determining whether Peer-1 is a trusted device. As such, Peer-1 is determined and assigned to the trusted level category of peer devices.

In the embodiment 432, the first message is the same and treated by the system in the same way. The SBC sends back a provisional response message followed by a final response message acknowledging that it received the request and is waiting a predetermined period for an acknowledgement message. Here, Peer-1 responds with a provisional response acknowledgement (PRACK) from Peer-1. As with the other subsequent messages, this subsequent message from Peer-1 in the context of the dialog that was initiated by the initial INVITE satisfies the "in context" rule for determining whether Peer-1 is a trusted device. As such, Peer-1 is determined and assigned to the trusted level category of peer devices.

The second variant also includes the embodiments shown in FIG. 5. For example, embodiment 500 begins with a message being sent from Peer-1 to the SBC. This message is an initial INVITE, initial SUBSCRIBE message with topmost record-route=Peer-2. Since this is a proper type and format of SIP message Peer-1 and Peer-2 are determined and assigned to the semi-trusted level.

The SBC sends back a provisional response message followed by a final response message acknowledging that it received the request and is waiting a predetermined period for an acknowledgement message. Here, Peer-1 responds with an acknowledgement from to the SBC. As with the other subsequent messages, this subsequent message from Peer-1 in the context of the dialog that was initiated by the initial INVITE satisfies the "in context" rule for determining whether Peer-1 is a trusted device. As such, Peer-1 is determined and assigned to the trusted level category of peer devices.

Peer-2 responds with an in-dialog request matching the dialog established with the initial INVITE request and is sent from the topmost record-route entity. Since the dialog matches the SIP message received from Peer-2, this subsequent message from Peer-2 in the context of the dialog that was initiated by the initial INVITE satisfies the "in context" rule for determining whether Peer-2 is a trusted device. As such, Peer-2 is determined and assigned to the trusted level category of peer devices.

In another embodiment at 530, this embodiment similarly begins with a message being sent from Peer-1 to the SBC. This message is an initial INVITE, initial SUBSCRIBE message with topmost record-route=Peer-2. Since this is a proper type and format of SIP message Peer-1 and Peer-2 are determined and assigned to the semi-trusted level.

The SBC sends back a provisional response message followed by a final response message acknowledging that it received the request and is waiting a predetermined period for an acknowledgement message. Here, Peer-1 responds with a PRACK message to Peer-2 and Peer-2 responds with a PRACK message to the SBC. As with the other subsequent messages, this subsequent message from Peer-2 in the context of the dialog that was initiated by the initial INVITE satisfies the "in context" rule for determining whether Peer-2 is a trusted device. As such, Peer-2 is determined and assigned to the trusted level category of peer devices.

The SBC responds with a PRACK message to Peer-2 which sents it's own PRACK message to Peer-1. The SBC also sends an INVITE message to Peer-1 which responds with an acknowledgement. Since the subsequent SIP message was in the context of the dialog initiated by the initial INVITE, this subsequent message from Peer-1 satisfies the "in context" rule for determining whether Peer-1 is a trusted device. As such, Peer-1 is determined and assigned to the trusted level category of peer devices.

FIG. 6 illustrates another embodiment of the second variant. Here, embodiment 600 begins with an OOD request (e.g., subscribe, publish, notify) from Peer-1 to the SBC. As the message is a proper SIP message in type and format, Peer-1 is determined and assigned to the semi-trusted level category of peer devices.

In this example, there is no subsequent communication from the SBC and the non-response triggers the SIP transaction retransmission protocol of the SIP system or the SIP transaction expired and a renewed request is transmitted from Peer-1 to the SBC. Since the same request is received from the same peer, Peer-1 is determined and assigned to the trusted level category of peer devices.

Figure 7:
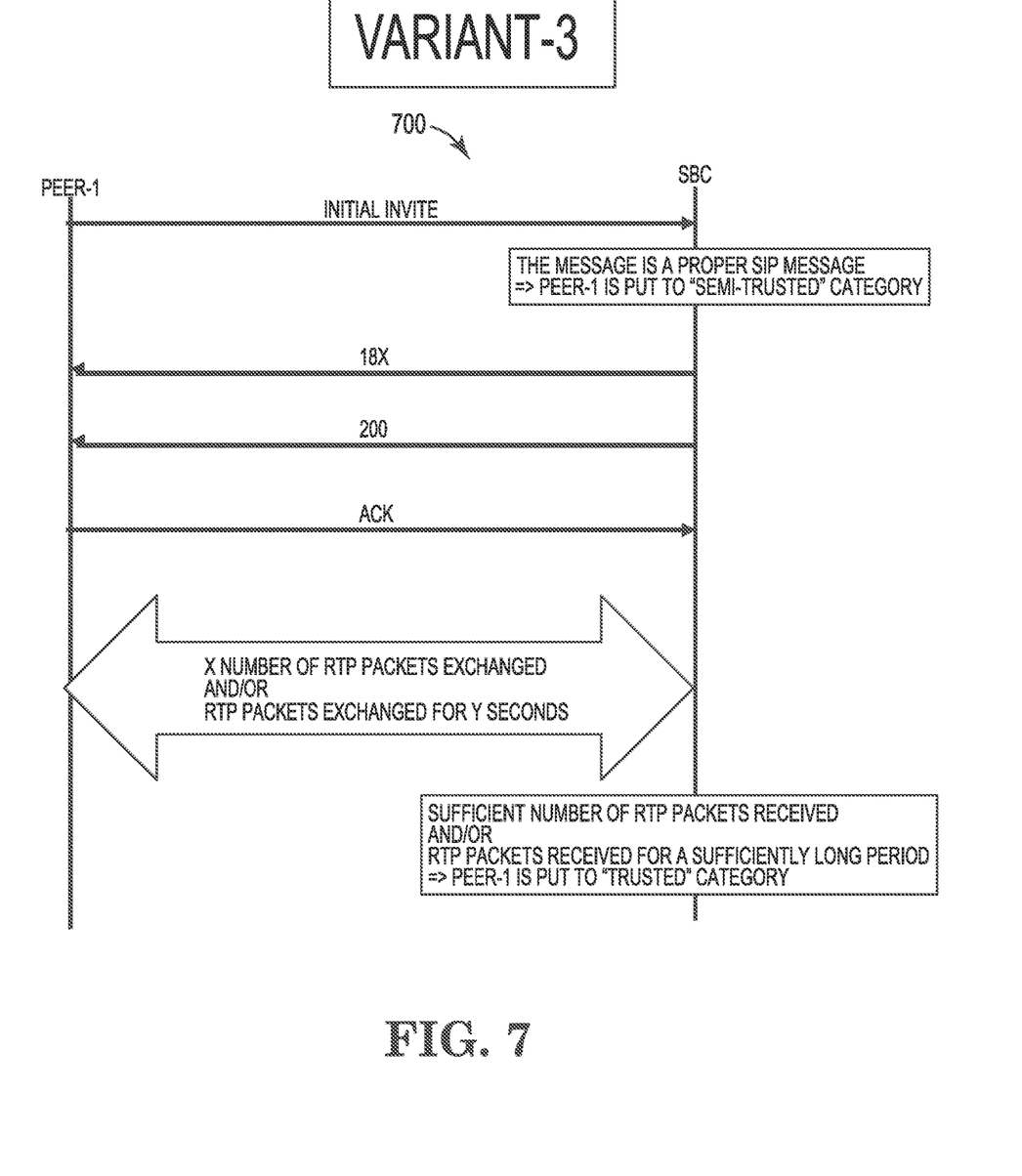
FIGS. 7-9 illustrate a third variant of a process for providing dynamic protection against amplification attacks according to one or more embodiments of the present disclosure.
Figure 8:
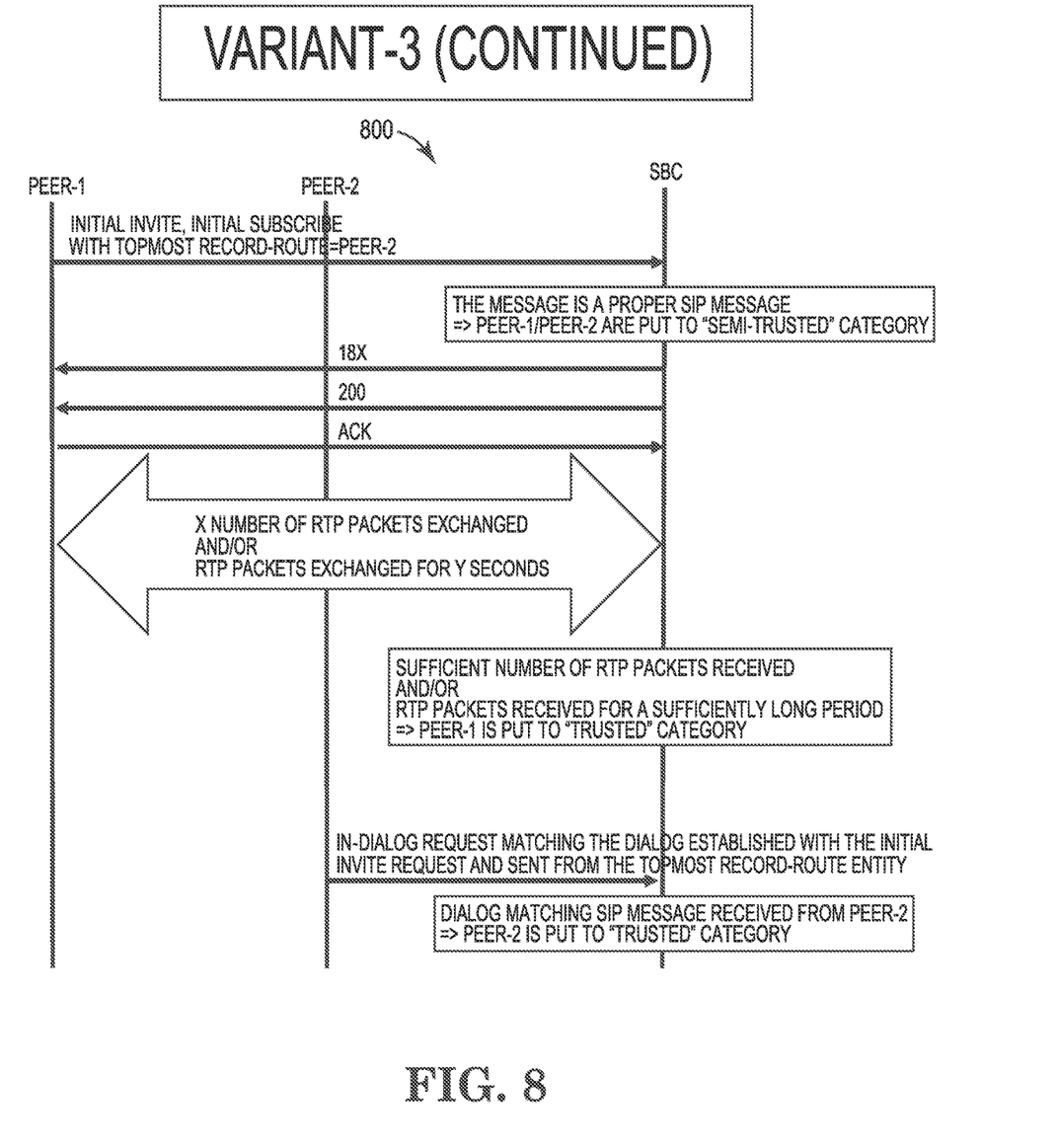
Figure 9:
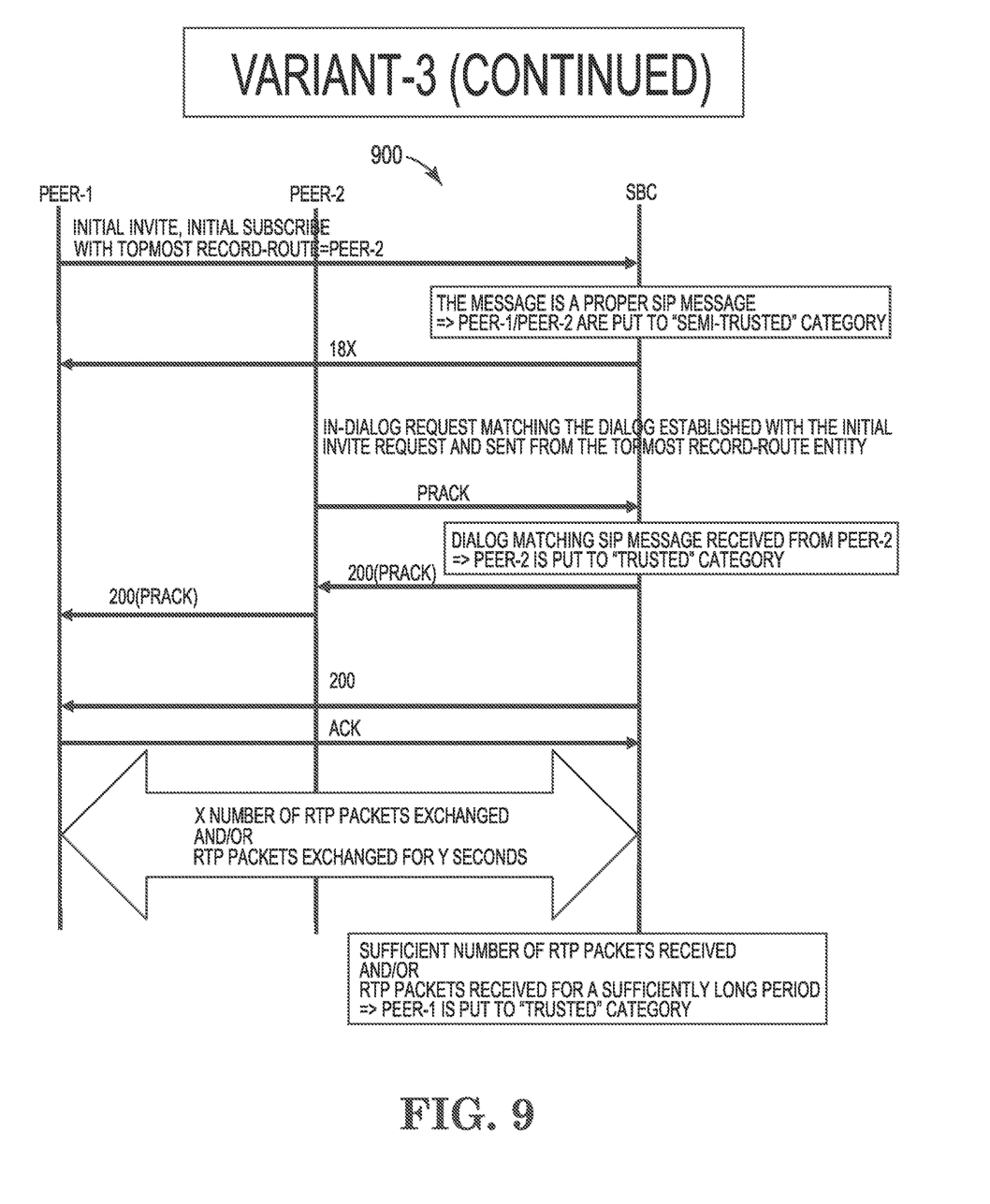

FIGS. 7-9 illustrate a third variant of a process for providing dynamic protection against amplification attacks according to one or more embodiments of the present disclosure. In these third variant embodiments, the system is monitoring the number of RTP packets are being exchanged to assist in the determination as to the trust level of a particular peer.

For instance, in embodiment 700, Peer-1 sends an initial INVITE request to the SBC. The type and format of this first message is a proper SIP message and, as such, the system determines and assigns Peer-1 to a semi-trusted level of peer devices. In this example, the SBC returns a response to Peer-1. Peer-1 then sends an acknowledgement message back to the SBC.

In this embodiment, the number of RTP packets is monitored. For example, a particular quantity of packets can be monitored or a number of packets over a period of time can be the quantities of packets monitored. Here, a sufficient number (over a configurable threshold quantity) of RTP packets were received and/or the quantity of packets received was over a sufficiently long period (over a threshold time period) and, accordingly, Peer-1 is determined and assigned to the trusted level category of peer devices.

The third variant also includes the embodiment shown in FIG. 8 which begins with a message being sent from Peer-1 to the SBC. This message is an initial INVITE, initial SUBSCRIBE message with topmost record-route=Peer-2. Since this is a proper type and format of SIP message Peer-1 and Peer-2 are determined and assigned to the semi-trusted level.

The SBC sends back a provisional response message followed by a final response message to Peer-1 acknowledging that it received the request and is waiting a predetermined period for an acknowledgement message. Here, Peer-1 responds with an acknowledgement to the SBC.

In this embodiment, as with the embodiment 700 above, the number of RTP packets is monitored. Again, a particular quantity of packets can be monitored or a number of packets over a period of time can be the quantities of packets monitored. Here, a sufficient number (over a configurable threshold quantity) of RTP packets were received and/or the quantity of packets received was over a sufficiently long period (over a threshold time period) and, accordingly, Peer-1 is again determined and assigned to the trusted level category of peer devices.

Additionally, Peer-2 responds with an in-dialog request matching the dialog established with the initial INVITE request and is sent from the topmost record-route entity. Since the dialog matches the SIP message received from Peer-2, this subsequent message from Peer-2 in the context of the dialog that was initiated by the initial INVITE satisfies the "in context" rule for determining whether Peer-2 is a trusted device. As such, Peer-2 is determined and assigned to the trusted level category of peer devices.

In the embodiment at 900 of FIG. 9, this embodiment begins with a message being sent from Peer-1 to the SBC. This message is an initial INVITE, initial SUBSCRIBE message with topmost record-route=Peer-2. Since this is a proper type and format of SIP message Peer-1 and Peer-2 are determined and assigned to the semi-trusted level.

The SBC sends back a provisional response message followed by a final response message acknowledging that it received the request and is waiting a predetermined period for an acknowledgement message. Here, Peer-2 responds with a PRACK message to the SBC. This is an in-dialog message established with the initial INVITE request and sent from the topmost record-route entity. Since the dialog matches that received from Peer-2, Peer-2 is determined and assigned to the trusted level category of peer devices.

The SBC sends a PRACK message to Peer-2 and Peer-2 sends a PRACK message to Peer-1.

Here, the number of RTP packets is again monitored. As in embodiments of FIGS. 7 and 8, a particular quantity of packets can be monitored or a number of packets over a period of time can be the quantities of packets monitored. Again, a sufficient number (over a configurable threshold quantity) of RTP packets were received and/or the quantity of packets received was over a sufficiently long period (over a threshold time period) and, accordingly, Peer-1 is again determined and assigned to the trusted level category of peer devices.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A communications method, the communications method comprising:
   receiving, at a session border controller (SBC), a first request message from a peer device that does not have an assigned trust level;
   determining, based on a type of communication that is received from the peer device, whether to classify the peer device as an untrusted level, semi-trusted level, or trusted level peer device;
   assigning the classification to the peer device for use in subsequent communications with the peer device;
   processing a packet flow from the peer device using a policer corresponding to the assigned classification;
   processing the packet flow from the policer and a number of packet flows from a number of policers using an aggregate policer, wherein a plurality of policers include the policer and the number of policers and a plurality of packet flows include the packet flow from the policer and the number of packet flows from the number of policers, wherein the policer admits the packet flow and the number of policers admit the number of packet flows, and wherein the aggregate policer adds a mark to a different number of packet flows of the plurality of packet flows which evaluates from which of the plurality of policers fill rate violations occur;
   limiting an aggregate fill rate of the plurality of packet flows to a maximum rate of packet flows using the aggregate policer, wherein the maximum rate of packet flows is a maximum rate for downstream application processing; and
   admitting the packet flow of the plurality of packet flows based on the packet flow from the policer using the aggregate policer.

2. The method of claim 1 further comprising:
   wherein when the first request message is a Session Initiation Protocol (SIP) invite type message, determining to classify the peer device as trusted.

3. The method of claim 1 further comprising:
   wherein when the first request message is a Session Initiation Protocol (SIP) subscribe type message, determining to classify the peer device as trusted.

4. The method of claim 1 further comprising:
   wherein when the first request message is a Session Initiation Protocol (SIP) invite type message, determining to classify the peer device as semi-trusted until a subsequent SIP message having a context of the SIP invite type message is received from the peer device, then updating the assigned classification to trusted.

5. The method of claim 1 further comprising:
   wherein when the first request message is a Session Initiation Protocol (SIP) subscribe type message, determining to classify the peer device as semi-trusted until a subsequent SIP message having a context of a Session Initiation Protocol (SIP) invite is received from the peer device, then updating the assigned classification to trusted.

6. The method of claim 1, wherein assigning a semi-trusted or untrusted classification to the peer device results in messages or packets received from the peer device by the SBC to be processed at a lower priority to those from trusted peer devices.

7. A session border controller (SBC) comprising:
a processor and memory wherein the memory includes instructions that are executable by the processor to:
receive a first request message from a peer device that does not have an assigned trust level;
determine, based on a type of communication that is received from the peer device, whether to classify the peer device as an untrusted level, semi-trusted level, or trusted level peer device;
assign the classification to the peer device for use in subsequent communications with the peer device;
process a packet flow from the peer device using a policer corresponding to the assigned classification;
process the packet flow from the policer and a number of packet flows from a number of policers using an aggregate policer, wherein a plurality of policers include the policer and the number of policers and a plurality of packet flows include the packet flow from the policer and the number of packet flows from the number of policers, wherein the policer admits the packet flow and the number of policers admit the number of packet flows, and wherein the aggregate policer adds a mark to a different number of packet flows of the plurality of packet flows which evaluates from which of the plurality of policers fill rate violations occur;
limit an aggregate fill rate of the plurality of packet flows to a maximum rate of packet flows using the aggregate policer, wherein the maximum rate of packet flows is a maximum rate for downstream application processing; and
admit the packet flow of the plurality of packet flows based on the packet flow from the policer using the aggregate policer.

8. The SBC of claim 7 further comprising:
wherein when the first request message is a Session Initiation Protocol (SIP) type message referring to a topmost record-route peer device, determining to classify the peer device as trusted, based on a reference to the topmost record-route peer device.

9. The SBC of claim 7 further comprising:
wherein when the first request message is a Session Initiation Protocol (SIP) invite type message, determining to classify the peer device as semi-trusted until a subsequent SIP message being an in-dialog request matching a dialog of the first request message and sent from a topmost record-route peer device, then updating the assigned classification to the peer device to trusted.

10. The SBC of claim 7 further comprising:
wherein when the first request message is a Session Initiation Protocol (SIP) subscribe type message, determining to classify the peer device as semi-trusted until a subsequent SIP message having a context of a Session Initiation Protocol (SIP) invite is received from the peer device, then updating the assigned classification to trusted.

11. The SBC of claim 7 further comprising:
wherein the peer device is a first peer device and when the first request message is an invite message referencing a second peer device that is a topmost record-route peer device, determining to classify the first peer device as semi-trusted until a subsequent SIP message having a context of the invite message is received from the first peer device, then updating the assigned classification to the first peer device to trusted.

12. The SBC of claim 7 further comprising:
wherein the peer device is a first peer device and when the first request message is a Session Initiation Protocol (SIP) subscribe type message, determining to classify the first peer device as semi-trusted until a subsequent SIP message having a context of a Session Initiation Protocol (SIP) invite is received from the first peer device, then updating the assigned classification to the first peer device to trusted and wherein there is a second peer device that is topmost record-route peer device and determining to classify the second peer device as semi-trusted until a different subsequent SIP message being an in-dialog request matching a dialog of the first request message and sent from the topmost record-route peer device, then updating the assigned classification to the second peer device to trusted.

13. The SBC of claim 7, wherein the policer is for untrusted packet flows, semi-trusted packet flows, or trusted packet flows.

14. A non-transitory computer readable medium including processor executable instructions which when executed by a processor included in a session border controller control the session border controller to perform the following operations:
receive, at the session border controller, a first request message from a peer device that does not have an assigned trust level;
determine, based on a type of communication that is received from the peer device, whether to classify the peer device as an untrusted level, semi-trusted level, or trusted level peer device;
assign the classification to the peer device for use in subsequent communications with the peer device;
process a packet flow from the peer device using a policer corresponding to the assigned classification;
process the packet flow from the policer and a number of packet flows from a number of policers using an aggregate policer, wherein a plurality of policers include the policer and the number of policers and a plurality of packet flows include the packet flow from the policer and the number of packet flows from the number of policers, wherein the policer admits the packet flow and the number of policers admit the number of packet flows, and wherein the aggregate policer adds a mark to a different number of packet flows of the plurality of packet flows which evaluates from which of the plurality of policers fill rate violations occur;
limit an aggregate fill rate of the plurality of packet flows to a maximum rate of packet flows using the aggregate policer, wherein the maximum rate of packet flows is a maximum rate for downstream application processing; and
admit the packet flow of the plurality of packet flows based on the packet flow from the policer using the aggregate policer.

15. The non-transitory computer readable medium of claim 14, wherein the type of communication of the first request message that is received from the peer device is one criterion for determining whether to classify the peer device as the untrusted level, semi-trusted level, or trusted level peer device, and a type of communication of a second message from the peer device is a second criterion.

16. The non-transitory computer readable medium of claim 14, wherein the type of communication of the first request message that is received from the peer device is used for making a first determination as to whether to classify the peer device as the untrusted level, semi-trusted level, or trusted level peer device, and a type of communication of a second message from the peer device is used for making a second determination as to whether to classify the peer device as the untrusted level, semi-trusted level, or trusted level peer device.

17. The non-transitory computer readable medium of claim 14, wherein the type of communication of the first request message that is received from the peer device is one criterion for determining whether to classify the peer device as the untrusted level, semi-trusted level, or trusted level peer device, and a quantity of route transfer protocol (RTP) packets exchanged with the peer device is a second criterion.

18. The non-transitory computer readable medium of claim 14, wherein the type of communication of the first request message that is received from the peer device is one criterion for determining whether to classify the peer device as the untrusted level, semi-trusted level, or trusted level peer device, and a quantity of route transfer protocol (RTP) packets exchanged over a predetermined time period with the peer device is a second criterion.

19. The non-transitory computer readable medium of claim 18, wherein the quantity of RTP packets exchanged is greater than a threshold value in order for the peer device to be classified as the trusted level peer device.

* * * * *